US 3,662,013
Patented May 9, 1972

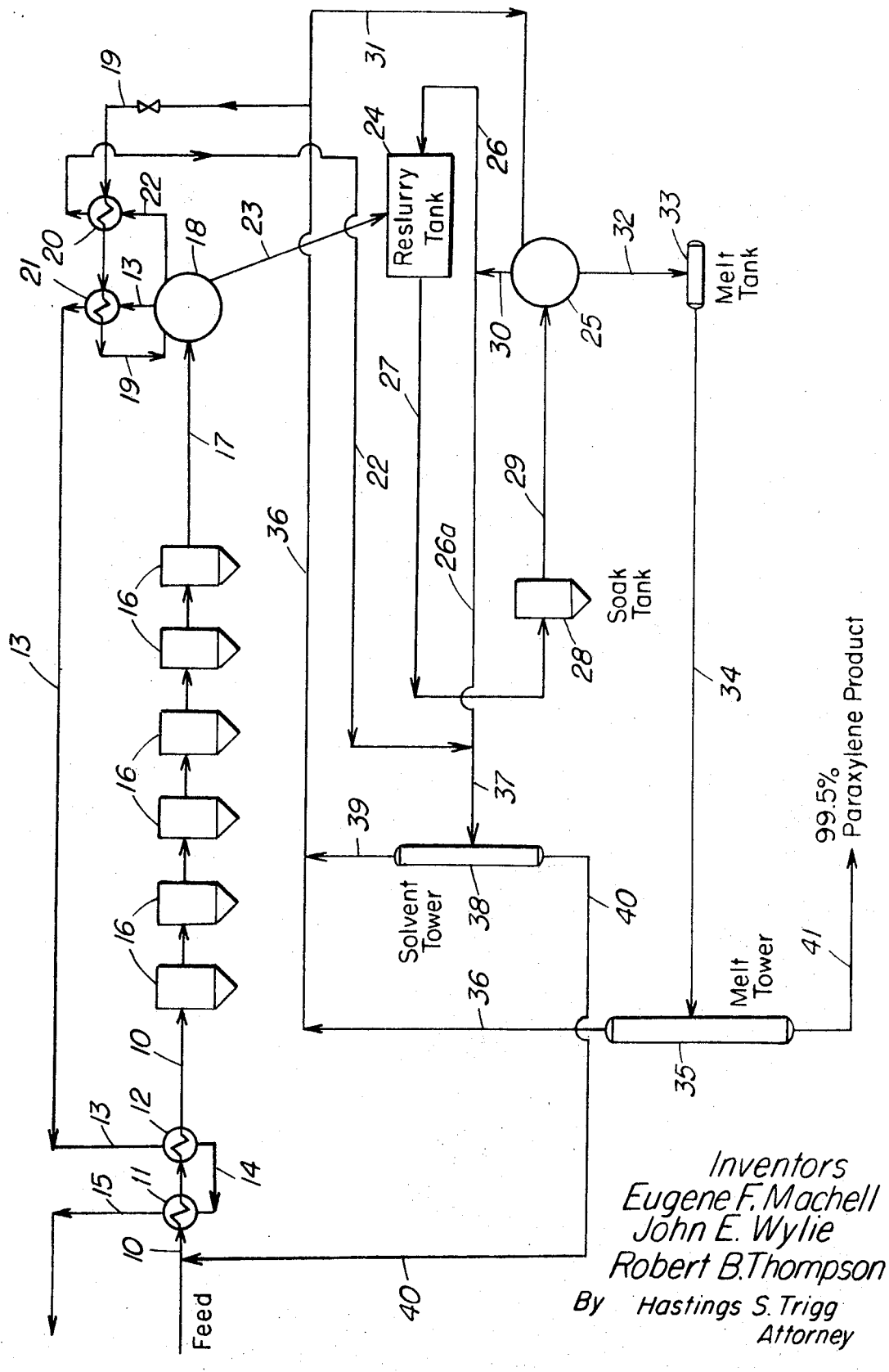

3,662,013
SINGLE STAGE CRYSTALLIZATION PROCESS FOR SEPARATING HIGH PURITY PARAXYLENE

Eugene F. Machell, New Canaan, Conn., John E. Wylie, Manhasset, N.Y., and Robert B. Thompson, Wilton, Conn., assignors to Mobil Oil Corporation
Filed Feb. 3, 1970, Ser. No. 8,215
Int. Cl. C07c 7/14
U.S. Cl. 260—674 A          3 Claims

ABSTRACT OF THE DISCLOSURE

High purity (above 99%) paraxylene is recovered from a mixture of xylene isomers in a one-stage crystallization process. The mixture is cooled down to the eutectic temperature and filtered. The filter cake is washed with toluene and then slurried in wash effluent, refiltered and washed with toluene.

BACKGROUND OF THE INVENTION

Field of the invention

This invention is concerned with a single stage crystallization process for separating paraxylene from a mixture of xylene isomers.

Description of the prior art

As a feed for oxidation to terephthalic acid, there is a demand for paraxylene of a purity above 99 percent. Various methods have been proposed for separating paraxylene from a $C_8$ isomer mixture, mostly involving two crystallization steps. Such methods, however, require additional (and uneconomical) cooling capacity. It has been proposed (U.S. 2,541,682) to effect a single stage separation, which involves washing paraxylene with a paraxylene-rich wash medium, but this process has the disadvantage of substantial loss in product recovery. It has, also, been proposed (U.S. 3,462,511) to effect single stage recovery, in which the product cake is washed with toluene and the toluene wash effluent is recycled to the crystallizer. The addition of toluene to the feed to the crystallizer, however, lowers the eutectic temperature and requires added cooling capacity. Moreover, none of the prior art single stage processes have shown the production of paraxylene having a purity of 99 percent or higher.

SUMMARY OF THE INVENTION

This invention provides a single stage process for recovering paraxylene from a mixture of xylene isomers that comprises cooling a mixture of xylene isomers in a crystallization zone to a temperature at which only paraxylene crystallizes, separating a paraxylene cake on a first filter, washing the paraxylene cake with toluene, slurrying the paraxylene cake with a portion of the toluene wash effluent from the first filter and from a second filter, filtering the resultant paraxylene slurry on a second filter to obtain a second paraxylene cake, washing the second paraxylene cake with toluene, distilling toluene from the paraxylene (for additional wash cycles) to recovery paraxylene product, distilling toluene from the remainder of the toluene wash effluent to recover a mixture of xylene isomers and recycling said mixture to the crystallization zone.

DESCRIPTION OF THE DRAWING

The drawing presents a schematic flow sheet of a method for carrying out the process of this invention.

DESCRIPTION OF SPECIFIC EMBODIMENTS

Feeds for the paraxylene recovery process of this invention are predominately $C_8$ aromatic hydrocarbon fractions boiling within the range of about 250° to 300° F. In general, typical feeds contain, by weight, about 15–30% paraxylene, about 30–70% metaxylene, and minor amounts of orthoxylene and ethylbenzene. Small amounts of paraffins and other aromatic hydrocarbons may also be present.

Referring to the drawing, a suitable $C_8$ aromatic hydrocarbon feed is introduced through a line 10 and passed through heat exchangers 11 and 12. In the heat exchangers 11 and 12, the feed is initially cooled by indirect heat exchange with mother liquor filtrate passed through lines 13, 14, and 15. The cooled feed is then passed through a crystallization zone, which, as shown, comprises a plurality of crystallizers or chillers 16. In the crystallization zone, the feed is cooled to a temperature at which paraxylene crystallizes without crystallization of other xylene isomers in the feed. Depending on the amounts of the various components present in the feed, this temperature will be within the range between about $-30°$ F. and about $-85°$ F.

The effluent from the crystallization zone will be a slurry of paraxylene in mother liquor. This effluent slurry is removed through a line 17 and passed into a first filter 18, which can be any type of batch or continuous filter, preferably a centrifugal filter. In the filter 18, mother liquor is separated and removed through line 13 and, as aforedescribed, heat exchanged with the feed and then discarded from the crystallization process. Remaining on the filter will be a cake of paraxylene crystals having a small amount of occluded mother liquor.

The cake is washed on the filter with toluene. The toluene is introduced through a line 19 and cooled by indirect heat exchange with toluene wash effluent in a heat exchanger 20 and with mother liquor in a heat exchanger 21. The toluene wash effluent is removed through a line 22.

The washed paraxylene cake is removed from the first filter 18 and transferred via a conduit 23 to a reslurry tank 24. The toluene wash effluent from line 22 is passed via line 37 to a solvent tower 38. Part of the mother liquor and toluene wash effluent from a second filter 25 are introduced through a line 26 into the reslurry tank 24 and admixed with the paraxylene crystals to form a slurry of paraxylene crystals in toluene wash effluent. This slurry is passed through a line 27 into a hold or soak tank 28 and then through a line 29 to the second filter 25. The second filter 25 can be the same type as or different from the first filter 18. Preferably, it is a batch or a continuous centrifuge filter. In the second filter 25, toluene wash effluent is separated and removed through a line 30 to the line 26, leaving a second paraxylene cake on the second filter 25. Toluene is introduced through a line 31 into the second filter 25 to wash the paraxylene cake thereon. Toluene wash effluent is removed through the line 30. The washed paraxylene cake is removed from the filter 25 through a conduit 32 and passed to a melt tank 33. In the melt tank 33, the paraxylene crystals are melted to liquid paraxylene which will also contain small amounts of toluene. This is passed through a line 34 to a melt tower 35, wherein toluene is distilled off and removed through a line 36. The bottoms, which is paraxylene product of at least 99% purity, is removed through a line 41.

The portion of the toluene and mother liquor from line 30 not passed into line 26 is passed through lines 26a and 37 to a solvent tower 38. Toluene is separated and passed through a line 39 to line 36. The bottoms, which is a mixture of xylene isomers, is recycled through a line 40 to line 10.

EXAMPLE

A feed containing by volume, 13.0% ethylbenzene, 25.6% paraxylene, 56.2% metaxylene, 4.9% orthoxylene, and 0.3% toluene was subjected to the aforedescribed crystallization process. The feed was charged at a rate of 56 cubic meters per hour (cmh.), to which was added bottoms from the solvent tower at a rate of 2 cmh. This mixture was cooled to —77° F. by passing it through a series of 6 crystallizers. After the second and third crystallizers, screen drain was added to the stream at a rate of one cmh. for each addition. The effluent from the last crystallizer containing paraxylene crystals and mother liquor, was passed into a continuous centrifuge and the paraxylene crystals were isolated on the filter as a cake. The cake was washed with toluene (at —58° F.) at a rate of about 0.8 cmh. and toluene wash effluent was remixed. The washed cake was reslurried with toluene wash effluent at —17° F. in an amount to give a slurry containing about 45% solids. This slurry was filtered in a centrifuge to recover a paraxylene cake. This cake was melted and toluene was removed. The final recovered product was 99.5 weight percent paraxylene.

It will be recognized that the rates and conditions can vary somewhat from those specifically set forth in the example. As was indicated hereinbefore, crystallizing temperature will depend on the feed used. The toluene wash on the first filter can be from about —48° F. to about —68° F. at a rate of about 0.7 to about 1.0 cmh. The reslurrying can be at temperatures of about 32° F. to about —4° F. The toluene wash on the second filter can be from about 32° F. to about —31° F. at a rate of about 0.4 to 0.6 cmh.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A single stage process for recovering paraxylene from a mixture of xylene isomers that comprises cooling a mixture of xylene isomers in a crystallization zone to a temperature at which only paraxylene crystallizes, separating a paraxylene cake on a first filter and discarding mother liquor washing the paraxylene cake with toluene at a temperature of about —48° F. to about —68° F., slurrying the paraxylene cake with a portion of the mother liquid and toluene wash effluent from a second filter, soaking the resultant slurry, filtering the resultant paraxylene slurry on a second filter to obtain a second paraxylene cake, washing the second paraxylene cake with toluene at a temperature of about 32° F. to about —31° F., distilling toluene from the paraxylene (for additional wash cycles) to recover paraxylene product, distilling toluene from the remainder of the toluene wash effluent to recover a mixture of xylene isomers and recycling said mixture to the crystallization zone.

2. The process of claim 1, wherein said crystallization zone comprises a plurality of crystallizers in series.

3. A single stage process for recovering paraxylene from a mixture of xylene isomers that consists essentially of cooling a mixture of xylene isomers in a crystallization zone to a temperature at which only paraxylene crystallizes, separating a paraxylene cake on a first filter and discarding mother liquor, washing the paraxylene cake with toluene at a temperature of about —48° F. to about —68° F., slurrying the paraxylene cake with a portion of the mother liquor and toluene wash effluent from a second filter, soaking the resultant slurry, filtering the resultant paraxylene slurry on a second filter to obtain a second paraxylene cake, washing the second paraxylene cake with toluene at a temperature of about 32° F. to about —31° F., distilling toluene from the paraxylene (for additional wash cycles) to recover paraxylene product, distilling toluene from the remainder of the toluene wash effluent to recover a mixture of xylene isomers and recycling said mixture to the crystallization zone.

References Cited
UNITED STATES PATENTS 3,462,509   8/1969   Dresser et al. _____ 260—674

DELBERT E. GANTZ, Primary Examiner

C. E. SPRESSER, JR., Assistant Examiner

PO-1050
(5/69)

UNITED STATES PATENT OFFICE
CERTIFICATE OF CORRECTION

Patent No. 3,662,013          Dated May 9, 1972

Inventor(s) EUGENE F. MACHELL, JOHN E. WYLIE and ROBERT B. THOMPSON

It is certified that error appears in the above-identified patent and that said Letters Patent are hereby corrected as shown below:

Column 3, Line 14,        "remixed" should be --removed--.

Signed and sealed this 25th day of July 1972.

(SEAL)
Attest:

EDWARD M. FLETCHER, JR.     ROBERT GOTTSCHALK
Attesting Officer             Commissioner of Patents